United States Patent
Hayatani et al.

(10) Patent No.: US 10,718,296 B2
(45) Date of Patent: Jul. 21, 2020

(54) HIGH-PRESSURE FUEL SUPPLY PUMP INCLUDING AN ELECTROMAGNETICALLY DRIVEN INTAKE VALVE

(71) Applicant: Hitachi Automotive Systems, Ltd., Hitachinaka-shi, Ibaraki (JP)

(72) Inventors: Masahiko Hayatani, Hitachinaka (JP); Satoshi Usui, Hitachinaka (JP); Hideki Machimura, Hitachinaka (JP); Tatsuo Kawano, Hitachinaka (JP); Syunsuke Aritomi, Tokyo (JP); Shingo Tamura, Hitachinaka (JP)

(73) Assignee: HITACHI AUTOMOTIVE SYSTEMS, LTD., Hitachinaka-Shi (JP)

(*) Notice: Subject to any disclaimer, the term of this patent is extended or adjusted under 35 U.S.C. 154(b) by 0 days.

(21) Appl. No.: 16/111,619

(22) Filed: Aug. 24, 2018

(65) Prior Publication Data
US 2018/0363590 A1    Dec. 20, 2018

Related U.S. Application Data

(63) Continuation of application No. 14/368,041, filed as application No. PCT/JP2012/080665 on Nov. 28, 2012, now Pat. No. 10,087,889.

(30) Foreign Application Priority Data

Jan. 20, 2012    (JP) ................. 2012-009538

(51) Int. Cl.
F04B 17/04    (2006.01)
F04B 49/22    (2006.01)
(Continued)

(52) U.S. Cl.
CPC ...... *F02M 21/0245* (2013.01); *F02M 59/366* (2013.01); *F02M 59/368* (2013.01);
(Continued)

(58) Field of Classification Search
CPC .... F02M 9/366; F02M 9/367; F02M 63/0017; F02M 63/0035; F04B 49/22;
(Continued)

(56) References Cited

U.S. PATENT DOCUMENTS 4,911,196 A * 3/1990 Kemp ................ F16K 15/026
137/220
5,826,562 A * 10/1998 Chen ..................... F02G 5/00
123/446

(Continued)

FOREIGN PATENT DOCUMENTS

JP    H5-133303 A    5/1993
JP    H8-326628 A    12/1996
(Continued)

OTHER PUBLICATIONS

PCT International Search Report on application PCT/JP2012/080665 dated Mar. 12, 2013; 4 pages.
(Continued)

*Primary Examiner* — Philip E Stimpert
(74) *Attorney, Agent, or Firm* — Foley & Lardner LLP

(57) ABSTRACT

A high-pressure fuel supply pump including an electromagnetically driven intake valve is configured such that a pressure equalizing hole is provided in the valve stopper positioned between the valve and a pressurizing chamber. The pressure equalization hole connects a spring storage space, provided between a valve and a valve stopper, with a surrounding fluid passage. The high-pressure fuel supply pump is further configured such that an opening of the pressure equalizing hole at the spring storage chamber side is open at a position at the inner side of a diameter of the spring. Since the pressure in the pressurizing chamber can be introduced into the inner side of the spring without traversing the spring, the unstable behavior of the spring or the valve due to the introduced pressure eliminated. Since the
(Continued)

force applied to the valve when the valve closes is stabilized, the closing timing of the valve is stable.

5 Claims, 10 Drawing Sheets

(51) Int. Cl.
    *F02M 21/02* (2006.01)
    *F02M 59/36* (2006.01)
    *F02M 59/46* (2006.01)

(52) U.S. Cl.
    CPC ........ *F02M 59/462* (2013.01); *F02M 59/464* (2013.01); *F04B 17/04* (2013.01); *F04B 49/225* (2013.01); *F02M 2200/304* (2013.01); *F02M 2200/50* (2013.01); *Y02T 10/32* (2013.01)

(58) Field of Classification Search
    CPC ........ F04B 49/243; F04B 49/24; F04B 17/04; F04B 9/042; F16K 15/18; F16K 15/026
    See application file for complete search history.

(56) References Cited

U.S. PATENT DOCUMENTS

| | | | |
|---|---|---|---|
| 6,247,452 | B1 | 6/2001 | Dittus et al. |
| 8,740,579 | B2 | 6/2014 | Aritomi et al. |
| 2008/0237518 | A1 | 10/2008 | Furuta et al. |
| 2009/0097991 | A1 | 4/2009 | Rosu |
| 2010/0024891 | A1* | 2/2010 | Francini ................ F16K 15/026 137/14 |
| 2010/0209274 | A1 | 8/2010 | Oikawa et al. |
| 2011/0123376 | A1* | 5/2011 | Aritomi ............... F02M 59/462 417/540 |
| 2011/0200463 | A1* | 8/2011 | Boecking .............. F04B 1/0426 417/328 |
| 2012/0090708 | A1* | 4/2012 | Usui .................. F02M 63/0017 137/565.16 |

FOREIGN PATENT DOCUMENTS

| | | | |
|---|---|---|---|
| JP | 2004-218633 | A | 8/2004 |
| JP | 2006-291838 | A | 10/2006 |
| JP | 2009-203987 | A | 9/2009 |
| JP | 2010-121595 | A | 6/2010 |
| JP | 2010-156256 | A | 7/2010 |
| JP | 2010-209907 | A | 9/2010 |
| JP | 2012-082809 | A | 4/2012 |
| JP | 2012-082810 | A | 4/2012 |
| WO | WO 2010/095247 | A1 | 8/2010 |

OTHER PUBLICATIONS

Japanese Office Action for Application No. 2012-009538 dated Jun. 6, 2014, 4 pages.

* cited by examiner

HIGH-PRESSURE FUEL SUPPLY PUMP INCLUDING AN ELECTROMAGNETICALLY DRIVEN INTAKE VALVE

CROSS-REFERENCE TO RELATED APPLICATIONS

This application is a Continuation of U.S. Ser. No. 14/368,041, filed Jun. 23, 2014, which is the National Phase of PCT/JP2012/080665, filed Nov. 28, 2012, which claims priority to Japanese Application No. 2012-009538, filed Jan. 20, 2012, the disclosures of all of which are hereby incorporated by reference in their entirety.

TECHNICAL FIELD

The present invention relates to a high-pressure fuel supply pump including an electromagnetically driven intake valve, and particularly to a high-pressure fuel supply pump where an electromagnetically driven intake valve is configured from a valve of outwardly opening type which has a valve element at a pressurizing chamber side of a valve seat.

BACKGROUND ART

A conventional high-pressure fuel supply pump like the one described above is configured in the following manner as disclosed, for example, in Patent Document 1 and Patent Document 2. In particular, a valve is formed from a tubular member and is disposed at a pressurizing chamber side with respect to a valve seat (at the downstream side of the valve seat). A valve stopper is provided between the pressurizing chamber and the valve, the valve stopper restricting the open position of the valve. A spring is located between the stopper and the valve, the spring biasing the valve ire the closing direction. A space housing a spring therein is formed between the valve and the valve stopper when such a configuration as described above is adopted. The space, an enclosed space sealed off from surrounding fluid, has an influence on the responsiveness of the valve. A communication path having the enclosed space connected to a surrounding fluid passage is therefore provided.

PRIOR ART LITERATURE

Patent Document

Patent Document 1: JP-2009-203987-A
Patent Document 2: JP-2006-291838-A

SUMMARY OF THE INVENTION

Problems to be Solved by the Invention

An intake valve of a high-pressure pump, however, has fuel with a greatly high flow rate flowing around a very light valve in opposite directions at times of intake and spilling. The valve of the intake valve violently acts not only in forward and backward directions but also in leftward and rightward or circumferential directions in the flow of fuel accordingly. In order to introduce the fuel pressure around the valve into the enclosed space in such surrounding conditions as described above, the surrounding fuel pressure has been introduced from a transverse direction of the valve across the spring in the conventional technologies. The valve of a light weight repeated unpredictable unstable movements, leading to the intense discharge flow rate variation of the fuel. As a result, the pressure variation of a common rail where the pump of the prior art is used is found out to be as great as in FIG. 7A in measurements. This variation had a negative effect on the fuel injection of the injector.

It is an object of the present invention to keep the movement of a valve steady so as to stabilize the discharge flow rate of fuel against an unintended variation of fuel as a consequence and thereby to reduce the pressure variation of a common rail.

Means for Solving the Problems

In order to achieve the object described above, the present invention offers a pressure equalizing hole which connects a spring storage space, provided between a valve and a valve stopper, to a surrounding fluid passage, the hole being provided in the valve stopper located between the valve and a pressurizing chamber. The pressure equalizing hole is configured to have an opening thereof on a side of the spring storage space, the opening being located on an inner side of a diameter of the spring The pressure equalizing hole is preferably provided such that a center axial line thereof does not cross with the spring at the inner side of the spring.

The pressure equalizing hole preferably is a straight through-hole extending along the center axial line of the spring.

Preferably the valve stopper has a valve guide and the pressure equalizing hole extends through the valve guide.

The pressure equalizing hole is preferably open to the spring storage chamber beyond the position of a valve seat.

The pressure equalizing hole is preferably positioned on a center axial line of the valve.

The pressure equalizing hole is preferably positioned on a center axial line of a fuel introduction hole.

The pressure equalizing hole is preferably positioned on a center axial line of a plunger rod.

Effect of the Invention

The pressure in the pressurizing chamber can be introduced into the inner side of the spring without traversing the spring according to the present invention having the configuration described above. An unstable behavior of the spring or the valve by the introduced pressure can be eliminated. Since the force applied to the valve when the valve closes is stabilized, the closing timing of the valve can be stable. As a result, an unintended variation of the discharge amount is less likely to occur.

Figure 5A:
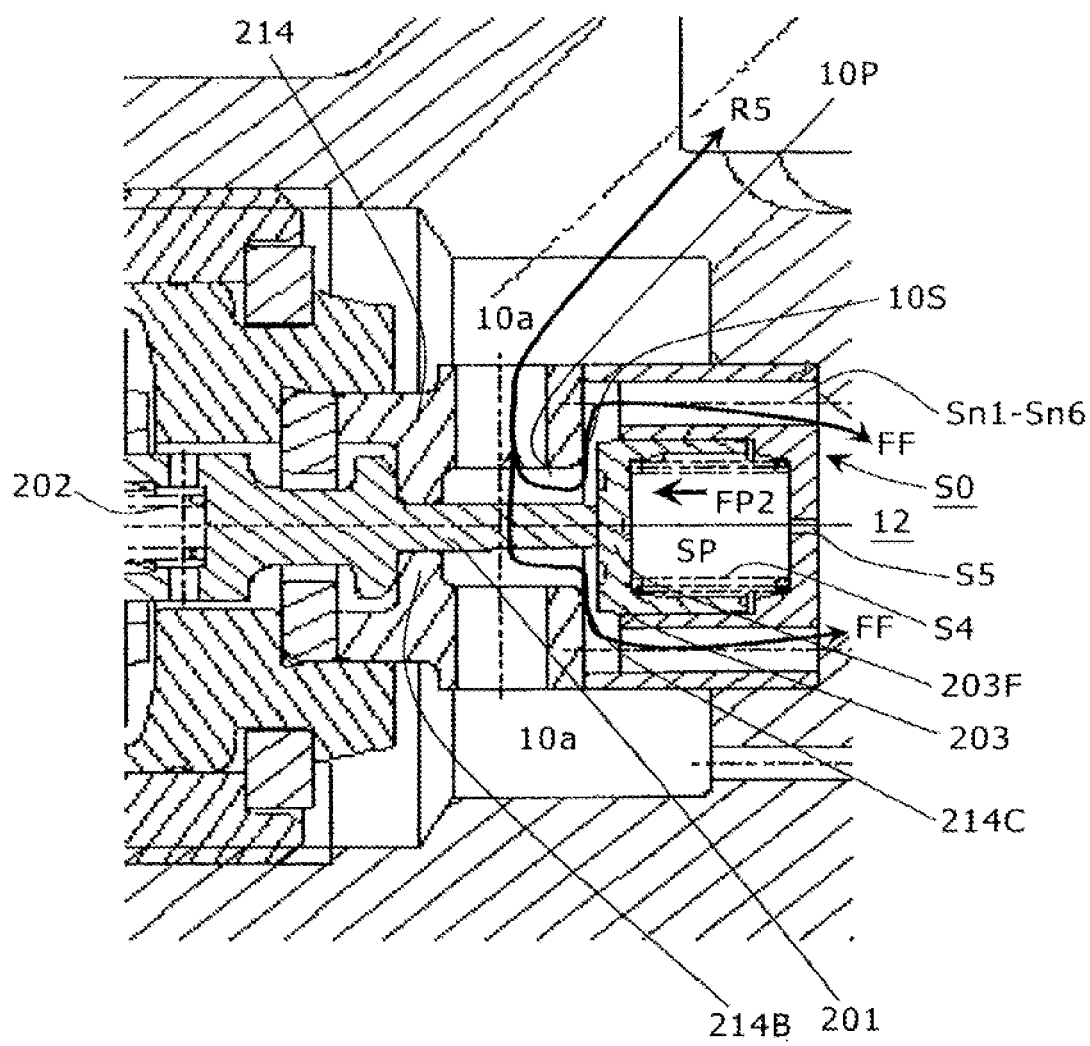
FIG. 5(A) is a sectional view depicting an electromagnetically driven intake valve according to a second embodiment in which the present invention is carried out.

5(B) is a view as seen in the direction indicated with an arrow mark P in FIG. 5(A) depicting a valve stopper of the electromagnetically driven intake valve according to the second embodiment in which the present invention is carried out.

Figure 6A:
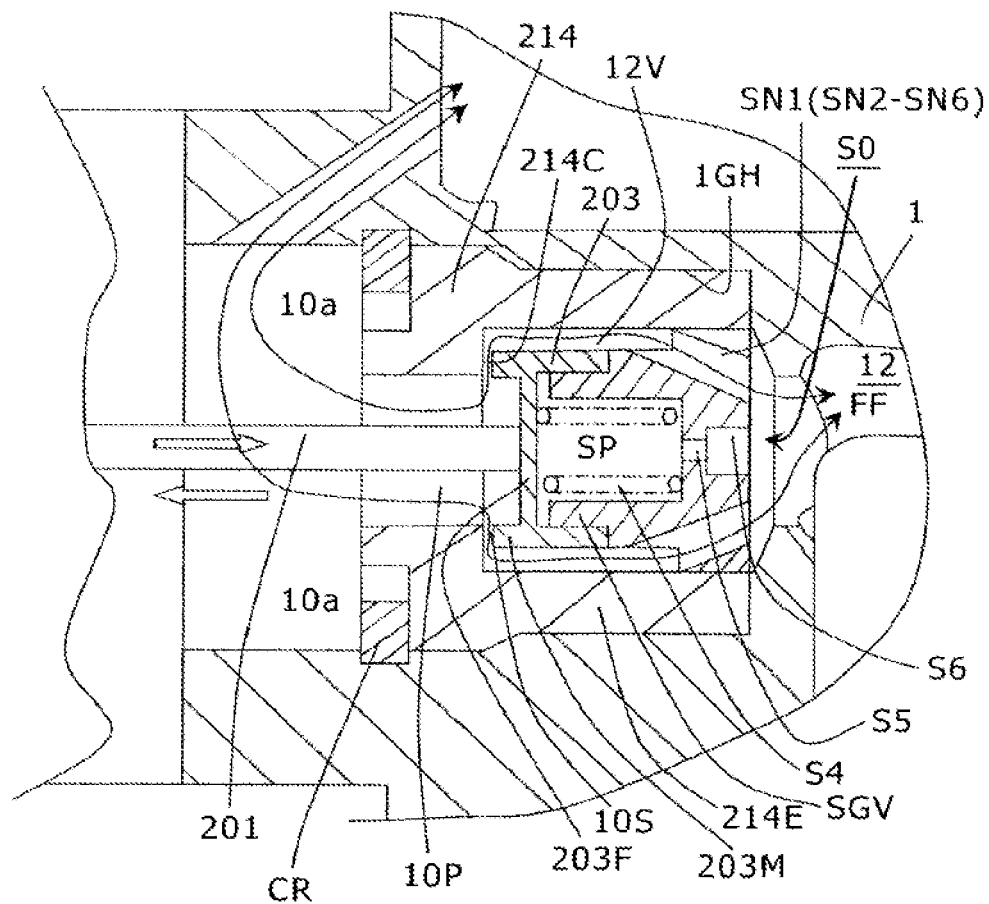

FIG. 6(A) is a sectional view depicting an electromagnetically driven intake valve according to a third embodiment in which the present invention is carried out.

Figure 6B:
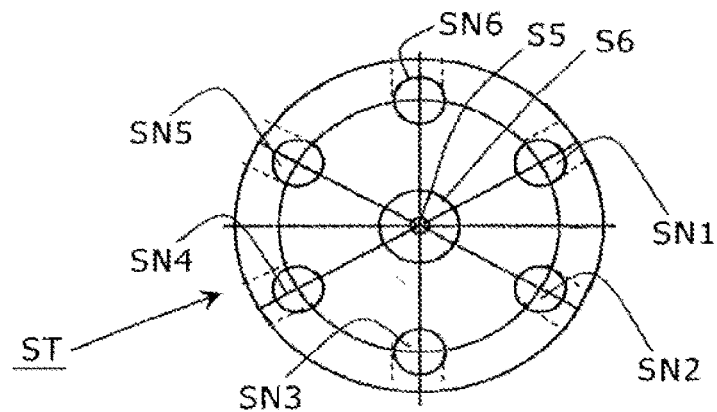

FIG. 6(B) is a view as seen in the direction indicated with an arrow mark P in FIG. 6(A) depicting a valve stopper of the electromagnetically driven intake valve according to the third embodiment in which the present invention is carried out.

Figure 7A:
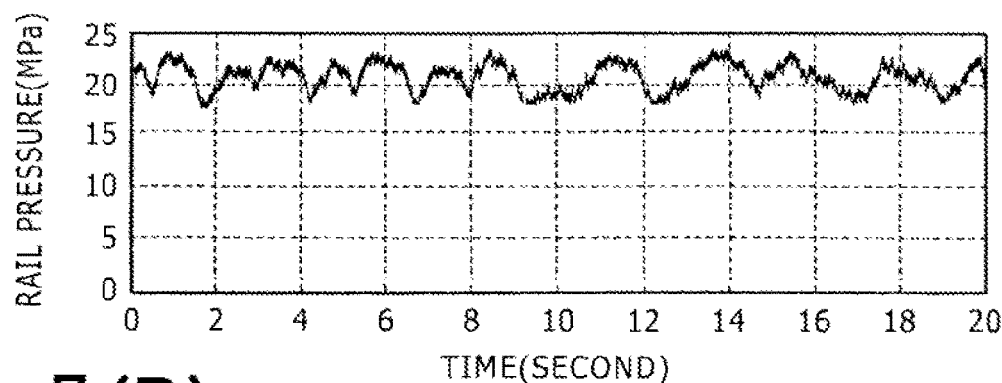

FIG. 7(A) is a graph illustrating a pressure variation of a conventional common rail.

Figure 7B:
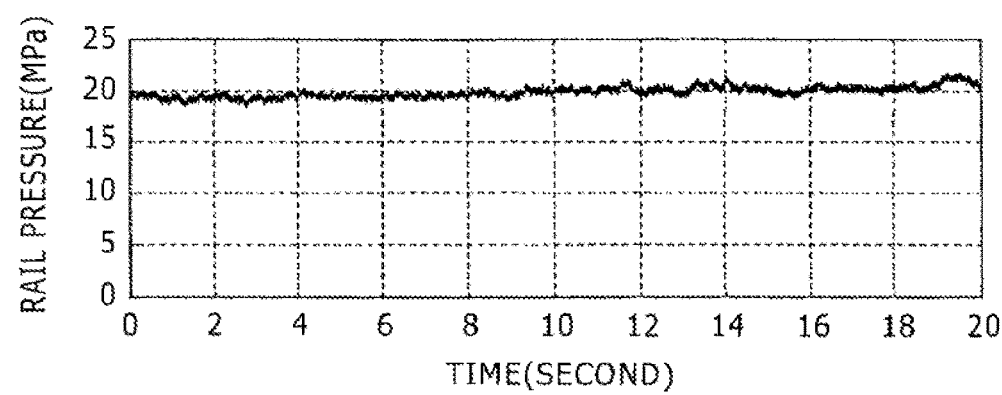

FIG. 7(B) is a graph illustrating a pressure variation of a common rail where a high-pressure fuel supply pump in which the present invention is carried out is used.

MODE FOR CARRYING OUT INVENTION

Embodiments of the present invention will be described with reference to the drawings in the following.

First Embodiment

A first embodiment of a high-pressure fuel supply pump in which the present invention is carried out is described with reference to FIGS. 1 to 4. Those reference numerals used in the following description but not in FIG. 1 cannot be applied in FIG. 1 to the details. The numbers instead are applied in enlarged views later described.

A pump housing 1 is provided with a recessed portion 12A that forms a bottomed tubular space open at one end of the tubular, the recessed portion 12A having A cylinder 20 inserted into the portion from the open end side. The space between an outer circumference of the cylinder 20 and the pump housing 1 is sealed with a pressure contacting portion 20A. A piston plunger 2 is slidably fitted in the cylinder 20, and consequently, an inner circumferential face of the cylinder 20 and an outer circumferential face of the piston plunger 2 are sealed therebetween with fuel which enters between the slidably fitting faces of them. As a result, a pressurizing chamber 12 is defined between a tip end of the piston plunger 2 on the one hand and an inner wall face of the recessed portion 12A and an outer circumferential face of the cylinder 20 on the other.

A tubular hole 200H is formed so as to extend from a peripheral wall of the pump housing 1 toward the pressurizing chamber 12. An intake valve unit of an electromagnetically driving mechanism unit EMD and a part of an electromagnetically driven intake valve mechanism 200 are inserted in the tubular hole 200H. A joining face 200R between an outer peripheral face of the electromagnetically driven intake valve mechanism 200 and the tubular hole 200H is joined to a gasket 300 to seal the inside of the pump housing 1 from the atmosphere. The tubular hole 200H sealed by the attachment of electromagnetically driven intake valve mechanism 200 functions as a low pressure fuel chamber 10a.

At a position opposed to the tubular hole 200H across the pressurizing chamber 12, a tubular hole 60H is provided so as to extend from a peripheral wall of the pump housing 1 toward the pressurizing chamber 12. A discharge valve unit 60 is mounted in the tubular hole 60H. The discharge valve unit 60 includes a valve seat member 61B which has a valve seat 61 formed at a tip end thereof and includes a through hole 11A provided at the center thereof, the through hole 11A serving as a discharge passage. A valve holder 62 is secured to an outer periphery of the valve seat member 61B and surrounds the outer circumference of the valve seat member 61B at the valve seat 61 side. A valve 63 and a biasing spring 64 are provided in the valve holder 62, and the biasing spring 64 biases the valve 63 in a direction to press the valve 63 toward the valve seat 61. At an opening of the tubular hole 60H at the opposite side to the pressurizing chamber, a discharge joint 11 is provided which is fixed to the pump housing 1 by means of a fastening screw.

The electromagnetically driven intake valve mechanism 200 includes an electromagnetically driven plunger rod 201. A valve 203 is provided at a tip end of the plunger rod 201 and opposed to a valve seat 214S formed on a valve housing 214. The valve housing 214 is provided at an end portion of electromagnetically driven intake valve mechanism 200.

A plunger rod biasing spring 202 is provided at the other end of the plunger rod 201 and biases the plunger rod in a direction in which the valve 203 moves farther away from the valve seat 214S. A valve stopper S0 is fixed to an inner peripheral portion of a tip end of the valve housing 214. The valve 203 is reciprocatably held between the valve seat 214S and the valve stopper S0. A valve biasing spring S4 is disposed between the valve 203 and the valve stopper S0, the valve 203 being urged by the valve biasing spring S4 in a direction in which the valve 203 moves farther away from the valve stopper S0.

Although the valve 203 and the tip end of the plunger rod 201 are urged in the opposite directions to each other by means of the individual springs, since the plunger rod biasing spring 202 has a stronger spring, the plunger rod 201 pushes the valve 203 in a direction (rightward direction in FIG. 1) in which the valve 203 moves farther away from the valve seat 214S against the force by the valve biasing spring S4. As a result, the valve 203 is pressed toward the valve stopper S0.

Figure 1:
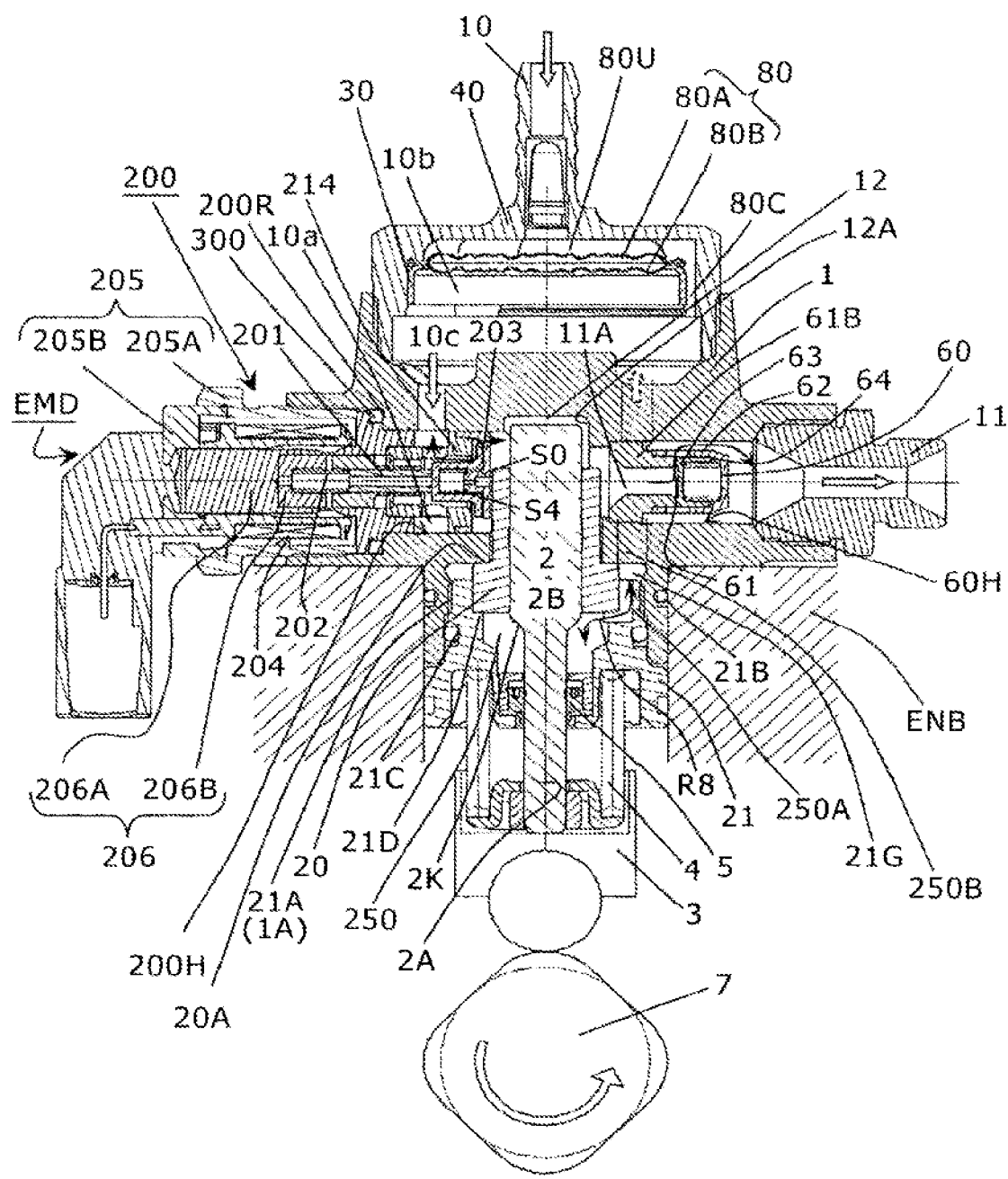
FIG. 1 is a general vertical sectional view of a high-pressure fuel supply pump which includes an electromagnetically driven intake valve according to a first embodiment in which the present invention is carried out.

Therefore, when the electromagnetically driven intake valve mechanism 200 is in a power OFF state (when an electromagnetic coil 204 is not energized), the valve 203 is urged in its opening direction by the plunger rod biasing spring 202 through the plunger rod 201. When the electromagnetically driven intake valve mechanism 200 is in a power OFF state, the plunger rod 201 and the valve 203 are maintained at their opening position as depicted in FIGS. 1, 2 and 3(A) (detailed configuration is hereinafter described).

Figure 2:
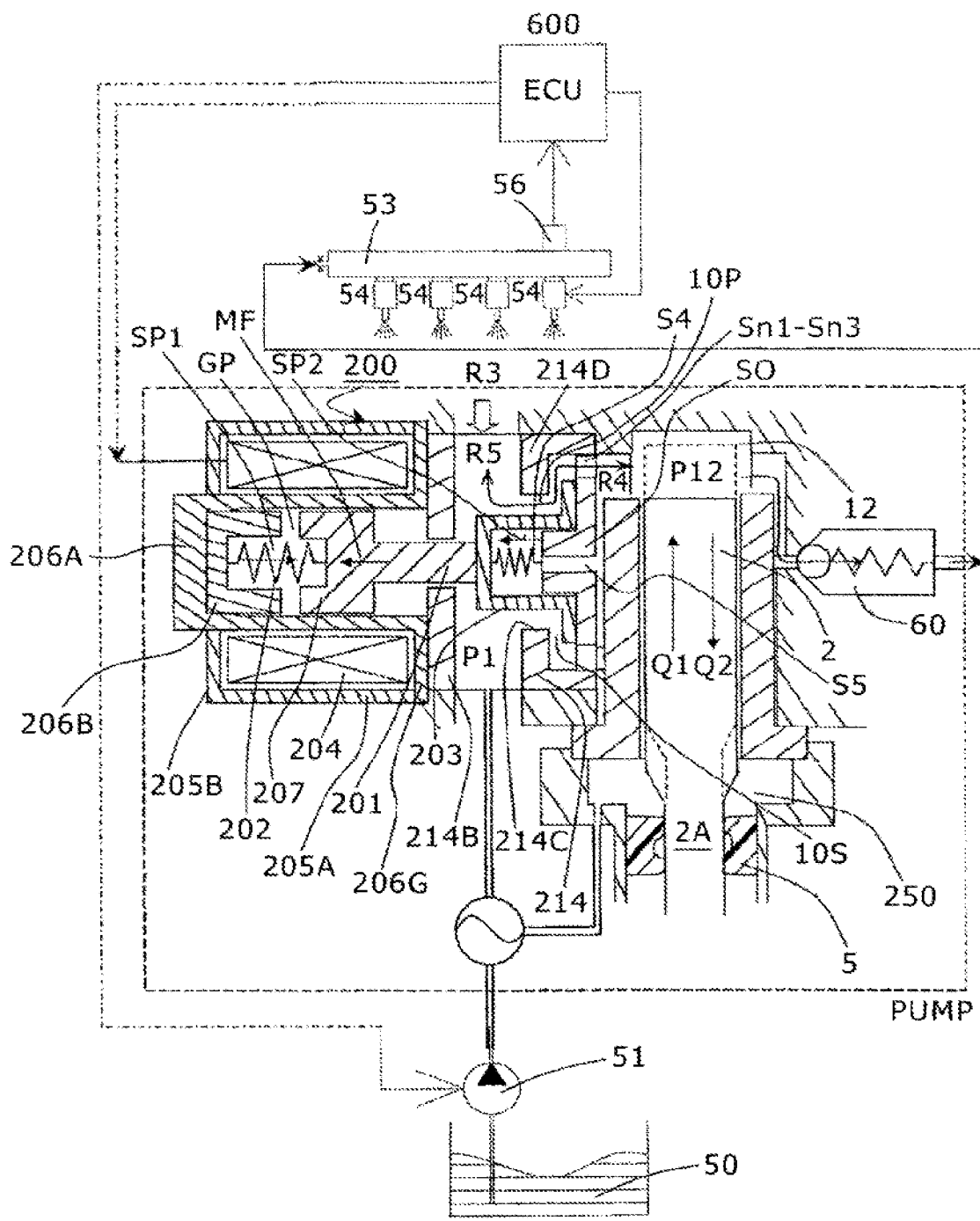
FIG. 2 is a system block diagram depicting an example of a fuel supply system which uses the high-pressure fuel supply pump in which the present invention is carried out.
Figure 3A:
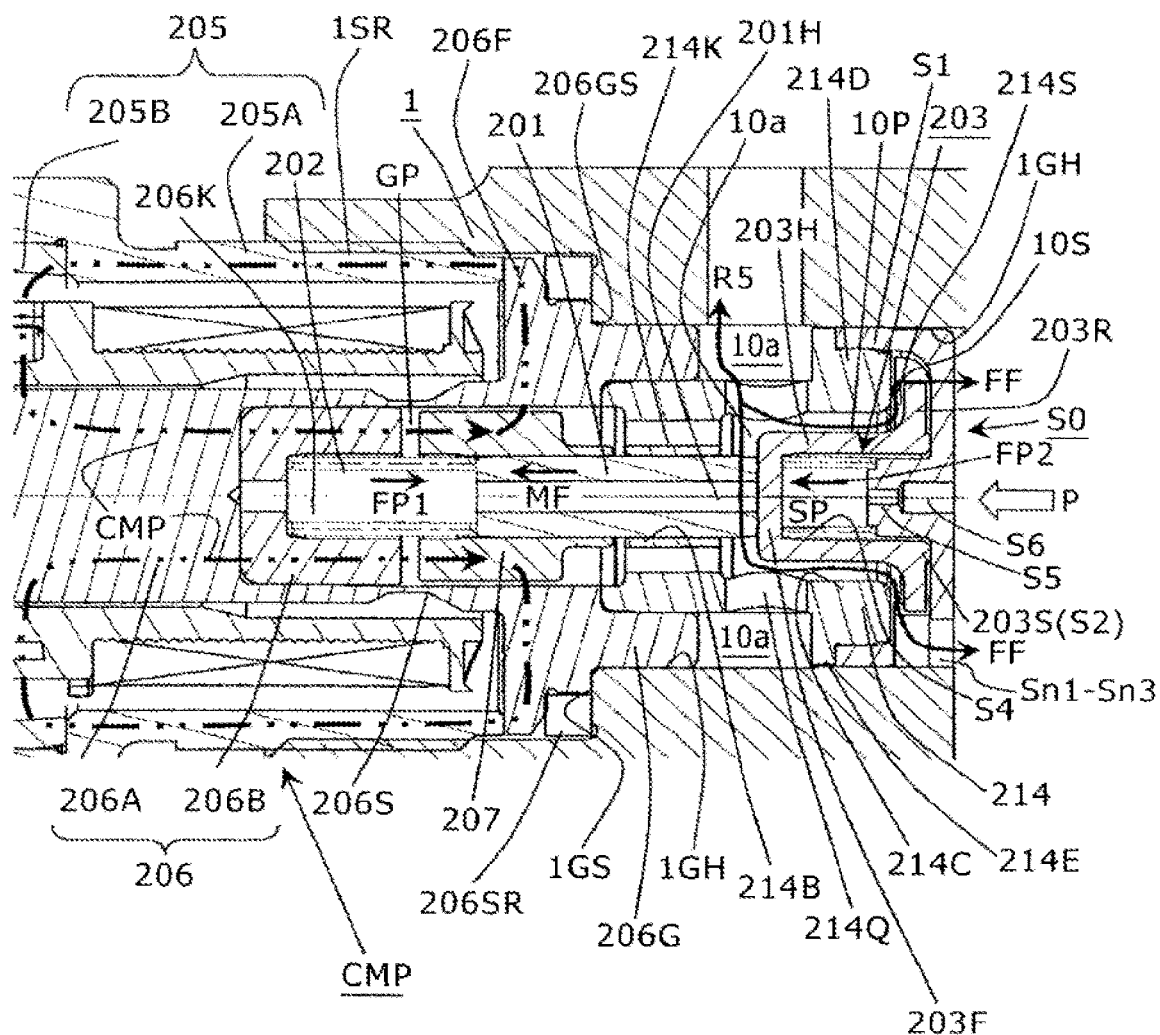
FIG. 3(A) is an enlarged sectional view of an electromagnetically driven intake valve according to the first embodiment in which the present invention is carried out and illustrates a state of the intake valve at the time of opening (at times of fuel intake and spilling).

As depicted in FIG. 2, fuel is introduced to an intake joint 10 as a fuel feed port of the pump housing 1 from a fuel tank 50 with the use of a low pressure pump 51.

A plurality of injectors 54 and a pressure sensor 56 are mounted on a common rail 53. The injectors 54 are mounted in accordance with the number of cylinders of the engine and inject high-pressure fuel fed to the common rail 53 into the cylinders in response to a signal of an engine controlling unit (ECU) 600. A relief valve mechanism (not shown) built in the pump housing 1 opens when the pressure in the common rail 53 exceeds a predetermined value to return the excessive high-pressure fuel to the upstream side of the discharge valve unit 60.

A lifter 3 provided at a lower end of the piston plunger 2 is subjected to pressure wielding to a cam 7 by means of a spring 4. The piston plunger 2 is slidably held in the cylinder 20 and is made to reciprocate by the cam 7 so as to change the volume of the pressurizing chamber 12. The cam 7 is rotated by an engine camshaft or the like. The cylinder 20 is held at an outer circumference of a lower end portion thereof by a cylinder holder 21. The cylinder 20 is subjected to the pressure wielding to the pump housing 1 at the pressure contacting portion 20A as a result of the cylinder holder 21 fixed to the pump housing 1.

A plunger seal 5 mounted on the cylinder holder 21 seals an outer circumference of a small diameter portion 2A formed at a lower end portion side of the piston plunger 2. An assembly of the cylinder 20 and the piston plunger 2 is inserted in the pressurizing chamber, and a male thread portion 21A formed on an outer circumference of the cylinder holder 21 is screwed in a thread portion 1A of a male thread portion formed on an inner circumference of an open side end portion of the recessed portion 12A of the pressurizing chamber 12. After the cylinder holder 21 pushing the cylinder 20 to the pressurizing chamber side in a state in which a step portion 21D of the cylinder holder 21 is locked to a circumferential edge of a pressuring chamber side end portion of the cylinder 20, the pressure contacting portion 20A is pressed toward the pump housing 1 to form the seal portion as a consequence of metal contact.

An O-snap ring 21B seals an area between an inner circumferential face of an attachment hole EH formed in an engine block ENB and an outer circumferential face of the cylinder holder 21. An O-snap ring 21C seals an area between an inner circumferential face of a pressurizing chamber side end portion of the recessed portion 12A of the pump housing 1 and an outer circumferential face of the cylinder holder 21 at a position of the side opposite to the pressurizing chamber side of the thread portion 21A (1A).

The pump is screwed at a flange (its details are omitted) of the pump housing 1 to the engine block. The pump is consequently fixed to the engine block.

A damper chamber 10b is formed in the midway of a passage from the intake joint 10 to the low pressure fuel chamber 10a. A two-ply metal diaphragm type damper 80 is stored in the damper chamber 10b in such a state that the two-ply metal diaphragm type damper 80 is sandwiched between a damper holder 30 and a damper cover 40. The two-ply metal diaphragm type damper 80 has a pair of upper and lower metal diaphragms 80A and 80B, which are butted with each other and welded at outer peripheral portions of the butted over an overall circumference to seal the inside of the two-ply metal diaphragm type damper 80.

Inert gas such as argon gas is enclosed in a hollow formed by the metal diaphragms 80A and 80B. The volume of the hollow varies in response to a change of the external pressure, the variation in turn leading to pulsation attenuation function.

In particular, a step portion is formed on the inner circumference of the damper cover 40, and an annular groove is provided on the step portion. The two-ply metal diaphragm type damper 80 is disposed such that its outer circumference welded portion fits completely in the groove, so that external force may not be transmitted from the circumjacent wall face to the two-ply metal diaphragm type damper 80. The two-ply metal diaphragm type damper 80 is further provided in such a manner that a portion of the face at one side of the two-ply metal diaphragm type damper 80 (face at the side to which the intake joint 10 of the damper cover is attached) which is at the inner side with respect to the outer circumferential welded portion may be held by the step portion. The damper holder 30 is a bottomless cup-shaped member (member which has a hole perforated at the center thereof and has, around the hole, a curved face with a cross section that is curved to the inner side). The damper holder 30 is force-fitted at an outer circumference thereof in the inner circumferential face of the damper cover 40. An end face portion of the curved portion abuts, over an overall circumference thereof, an annular face at the inner side with respect to the welded portion of the outer periphery of the two-ply metal diaphragm type damper 80. In a state in which the flange portion of the two-ply metal diaphragm type damper 80 is sandwiched between the abutment and the above-described step portion, the two-ply metal diaphragm type damper 80 is formed as one assembly (unit) together with the damper holder 30 and the damper cover 40. Thus, the damper chamber 10b is formed as a result of the pump housing 1 the damper cover 40 joined together with the use of screws. The intake joint 10 is configured perpendicularly to a central portion of an upper face of the damper cover 40 by way pf integral molding in the present embodiment. The intake joint 10 therefore assumes the same posture at any position in the direction of rotation even if the thread portion formed on the outer circumference of the damper cover 40 is screwed with the thread portion formed on an inner wall of the pump housing 1. The screwed position of the damper cover is not restrained, and the assembling properties of the damper cover 40 are improved.

A fuel passage 80U is provided between the diaphragm 80A at one side of the two-ply metal diaphragm type damper 80 and the damper cover 40. The fuel passage 80U is connected to the damper chamber 10b (fuel passage which the diaphragm 80B at the other side of the two-ply metal diaphragm type damper 80 faces) as a fuel passage through a groove passage 80C provided on the inner peripheral wall of the damper cover 40. The damper chamber 10b is made to communicate with the low pressure fuel chamber 10a through a communication hole 10c formed in the pump housing 1 which is a part of a bottom wall of the damper chamber 10b. The electromagnetically driven intake valve (valve 203) is located in the low pressure fuel chamber 10a. The fuel fed from the fuel tank 50 flows from the intake joint 10 into the damper chamber 10b and acts upon both metal diaphragms 80A and 80B of the two-ply metal diaphragm type damper 80. Meanwhile, the fuel flows into the low pressure fuel chamber 10a after passing the communication hole 10c.

A connecting portion between the small diameter portion 2A and a large diameter portion 2B of the piston plunger 2 is provided as a conical face 2K, the large diameter portion 25 slidably fits in with the cylinder 20. A fuel auxiliary chamber 250 is formed between the plunger seal 5 and a lower end face of the cylinder 20 around the conical face. The fuel auxiliary chamber 250 captures fuel leaking from the slidably contacting face between the cylinder 20 and the piston plunger 2. An annular passage 21G is defined and formed between an inner circumferential face of the pump housing 1 and an outer circumferential face of the cylinder 20. The annular passage 21G is connected at one end to the damper chamber 10b by way of a vertical passage 250B formed in and extending through the pump housing 1. The annular passage 21G is connected to the fuel auxiliary chamber 250 through a fuel passage 250A formed in the cylinder holder 21. Thus, the damper chamber 10b and the fuel auxiliary chamber 250 are made to communicate with each other through the vertical passage 250B, annular passage 21G, and fuel passage 250A.

When the piston plunger 2 moves upwardly and downwardly (moves back and forth), the volume of the fuel auxiliary chamber 250 changes since the tapered face 2K reciprocates in the fuel sub chamber. The fuel flows from the damper chamber 10b into the fuel auxiliary chamber 250 through the vertical passage 250B, annular passage 21G, and fuel passage 250A when the volume of the fuel auxiliary chamber 250 increases. The fuel flows from the fuel auxiliary chamber 250 into the damper chamber 10b through the vertical passage 250B, annular passage 21G, and fuel passage 250A when the volume of the fuel auxiliary chamber 250 decreases. If the piston plunger 2 moves upwardly from the bottom dead center when the valve 203 is in a state in which it is maintained at the open position (when the coil 204 is in a non-energized state), then the fuel taken into the pressurizing chamber overflows (spills) from the valve 203 in an open state into the low pressure fuel chamber 10a and then flows into the damper chamber 10b through the communication hole 10c. Thus, the fuel from the intake joint 10, the fuel from the fuel auxiliary chamber 250, the overflowing fuel from the pressurizing chamber 12 and the fuel from a relief valve (not shown) merge into the damper chamber 10b. As a result, fuel pulsations that the fuels have merge in the damper chamber 10b is absorbed by the two-ply metal diaphragm type damper 80.

A region surrounded by a broken line in FIG. 2 indicates the pump body part. A yoke 205 is provided at the inner circumference side of the coil 204 formed annularly and serves also as a body of the electromagnetic driving mechanism unit EMD. The yoke 205 has a stationary core 206 and an anchor 207 stored in an inner periphery thereof such that the plunger rod biasing spring 202 is sandwiched between the stationary core 206 and the anchor 207.

As particularly depicted in FIG. 3(A), the yoke 205 in the present embodiment is divided into a side yoke 205A and an upper yoke 205B which are joined together through press fitting. The stationary core 206 is formed from divisional parts of an outer core 205A and an inner core 206B which are joined together through press fitting. The anchor 207 is fixed to an end portion of the plunger rod 201 at the opposite side to the valve side through welding and opposes to the inner core 206B with a magnetic gap GP in-between. The coil 204 is stored in the yoke 205, and a thread portion provided on an outer periphery of an open end portion of the side yoke 205A is screwed with and fastened to a thread portion 1SR of the pump housing 1 to fix the side yoke 205A and the pump housing 1 to each other. Through this fixing work, the open end portion of the side yoke 205A pushes a flange portion 206F formed on an outer periphery of the outer core 206A toward the pump housing. Thereupon, the outer circumference of an open side end portion tubular portion 206G of the outer core 206A is inserted into an inner circumferential face of a guide hole 1GH of the pump housing 1. Further, an annular increased diameter portion 206GS formed as a step portion on the outer periphery of the open side end portion tubular portion 206G of the outer core 206A is pressed toward an annular face portion 1GS formed on the circumference at the open side of the guide hole 1GH of the pump housing 1. At this time, a seal ring 206SR disposed between the annular face portion 1GS formed on the outer periphery at the opening side of the guide hole 1GH of the pump housing 1 and the flange portion 206F formed on the outer periphery of the outer core 206A is compressed. Consequently, the space at the low pressure side including the space on the inner circumferential portion of the stationary core 206 and the low pressure fuel chamber 10a is sealed from the atmosphere.

A closed magnetic path CMP formed around the coil 204 from the side yoke 205A and upper yoke 205B, outer core 206A and inner core 206B and anchor 207 such that the closed magnetic path CMP traverses the magnetic gap GP. A portion of the outer core 206A which faces the periphery of the magnetic gap GP is formed in a slight thickness (when it is viewed from the outer periphery, a groove is formed), and this grooved portion forms a magnetic throttle 206S (having a function of magnetic resistance) of the closed magnetic path CMP. Accordingly, those magnetic fluxes which leak through the outer core 206A can be reduced, and those magnets fluxes which pass the magnetic gap GP can be increased as a result.

As depicted in FIGS. 3(A) to 3(C), 4(A) and 4(B), a bearing portion 214B is fixed through press fitting on the inner circumferential portion of the tubular portion 206G formed at an open side end portion of the outer core 206A. The bearing portion 214(B) is formed at one end of the valve housing 214. The plunger rod 201 extends through the bearing 214(B) to the low pressure fuel chamber 10a in the valve housing 214. Meanwhile, the valve 203 is stored in a center hole 214C (which functions as a fuel feed port) formed at the other end side of the valve housing 214. The valve 203 extends, at a left side end portion thereof in the figures, from the position of the valve seat 214S through the center hole 214C to the low pressure fuel chamber 10a. The valve seat 214S is formed at an end face portion of the valve housing 214 at the pressurizing chamber 12 side. As a result, the tip end of the plunger rod 201 is opposed to a flat face portion 203F of the valve 203 in the low pressure fuel chamber 10a.

A through-hole 201H is formed at the center of the plunger rod 201. The through-hole 201H made to communicate at one end thereof with a storage space for the plunger rod biasing spring 202 formed between the inner core 206B and the anchor 207. The through-hole. 201H is connected at the other end to the low pressure fuel chamber 10a in the inside of the valve housing. When the electromagnetically driving mechanism unit EMD is energized and the anchor 207 of the electromagnetic valve mechanism 200 is attracted to the inner core 206B of the stationary core 206 so that the valve 203 is pressed toward the valve seat 214S to establish a closed valve state, the tip end of the plunger rod 201 is spaced from the flat face portion 203F of the valve 203. At this time, the low pressure fuel chamber 10a and the storage space for the plunger rod biasing spring 202 are made to communicate with each other by the through-hole 201H. As a result, the fuel in the storage space for the plunger rod biasing spring 202 is discharged to the low pressure fuel chamber through the through-hole 201H. Consequently, the movement of the anchor 207 and the plunger rod 201 is smoothened. Further, even if the tip end of the plunger rod 201 is formed as a flat face, the sticking phenomenon between the tip end face of the plunger rod 201 and the flat face portion 203F of the valve 203 can be eliminated, and the supply power to the coil 204 of the electromagnetically driving apparatus EMD can be reduced. Forming the plunger rod 201 hollow decreases the weight of the plunger rod 201 and the driving power for the same as well.

The valve stopper S0 is fixed to the valve housing 214 as a result of press fitting the inner circumferential face of a tubular portion S1 {depicted in FIG. 3(A)} at an end portion thereof at the valve 203 side with an outer circumference of a pressurizing chamber side end portion outer peripheral face 214D of the valve housing 214. Further, the outer circumferential face of the tubular portion S1 {depicted in FIG. 3(A)} of the valve stopper S0 is press fitted in the inner circumference of the guide hole 1GH (diameter D4) of the pump housing 1. The valve 203 is reciprocatably mounted between the tip end portion of the plunger rod 201 and the valve stopper S0 with the valve biasing spring S4 interposed in-between. The valve 203 is opposed at a face at its one side to the pressurizing chamber side end face (valve seat 214S) of the valve housing 214 and has, on the other side face, an annular face portion 203R which opposes to the valve stopper S0. The valve 203 has, at its central portion of the annular face portion 203R, a bottomed tubular portion extending to the tip end of the plunger rod 201. The bottomed tubular portion is configured from a cylindrical portion 203H and the flat face portion 203F provided at the bottom of the tubular portion. The cylindrical portion 203H is stored in the center hole 214C of the valve housing 214 and projects to the inside of the low pressure fuel chamber 10a. A tubular fuel introduction passage 10P is formed between the outer circumference of the cylindrical portion 203H and the inner circumferential face of the center hole 214C of the valve housing 214. It is to be noted that a portion of the outer periphery indicated with slanting lines in FIG. 3(B) conveniently indicates a part of the pump housing 1 as an annular portion. The valve housing 214 and the tubular portion S1 of the valve stopper S0 can be seen in regions of the cutouts Sn1 to Sn3.

The tip end of the plunger rod 201 is dimensioned so that it can abut the surface of the flat face portion 203F of the end portion of the valve 203 at the plunger rod side in the low pressure fuel chamber 10a. However, the tip end of the plunger rod 201 is dimensioned so that, when the valve 203 is closed {state in FIG. 4(A)}, the tip end can be temporarily (within a certain period during energization of the electromagnetic coil) away by a distance Δs from the valve 203. Four fuel through-holes 214Q are provided in an equally spaced intervals from each other in a circumferential direction at a tubular portion of the valve housing 214 between the bearing 214B and the center hole 214C of the valve housing 214. The four fuel through-holes 214Q is connected to the inner side of the valve housing 214 and the low pressure fuel chamber 10a at the outer side of the valve housing 214. The tubular fuel introduction passage 10P is formed between the outer circumferential face of the cylindrical portion 203H of the valve 203 and the inner circumferential face of the center hole 214C of the valve housing 214. The fuel introduction passage 10P is connected at its one end to the low pressure fuel chamber 10a and at the other end to an annular (disk-shaped) fuel passage 10S formed between the valve seat 214S and the annular face portion 203R of the valve 203.

The valve stopper S0 has at its central portion a projection ST projecting to the bottomed tubular portion side of the valve 203, the projection ST having a cylindrical face portion SG. The cylindrical face portion SG functions as a guide portion for guiding the valve 203 during a stroke in an axial direction. The valve biasing spring S4 is retained between a valve side end face SH of the projection ST of the valve stopper S0 and the bottom face of the bottomed tubular portion of the valve 203. If the valve 203 strokes the fully open position under the guidance of the cylindrical face portion SG of the valve stopper S0, then an annular projection 203S formed at a central portion of the annular face portion 203R of the valve 203 is brought into contact a bottom face portion receiving face S2 (width HS2) of the valve stopper S0. At this time, an annular air gap SGP is formed around the annular projection 203S. The annular air gap SGP provides an early leaving function of causing, when the valve 203 starts its movement to the valve closing direction, pressure P4 of the fuel at the pressurizing chamber side to act upon the valve 203 so that the valve 203 rapidly leaves the valve stopper S0.

Figure 3B:
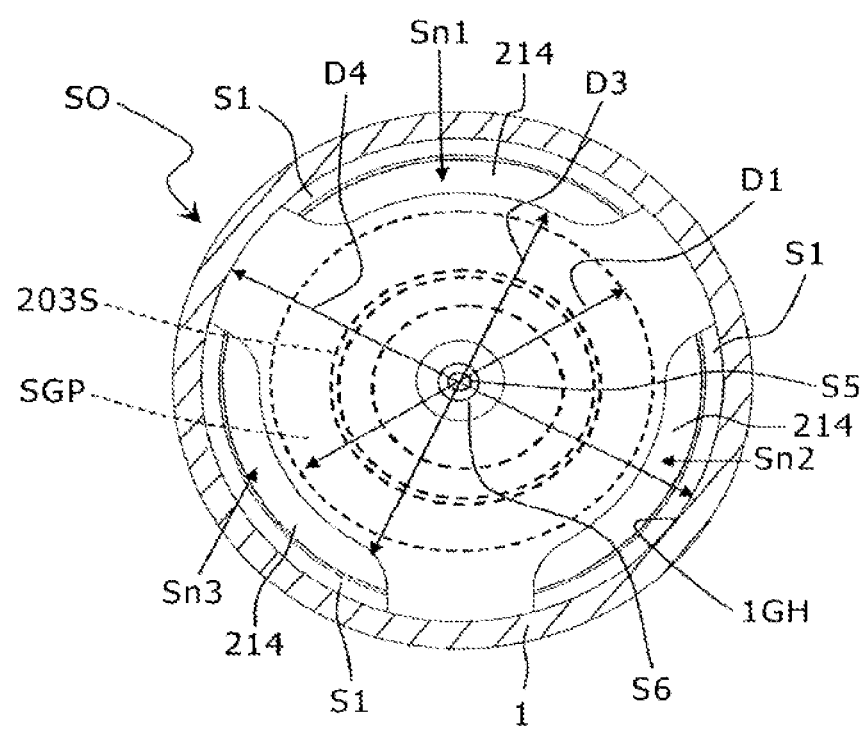
FIG. 3(B) is a view as seen in a direction indicated with an arrow mark P in FIG. 3(A) illustrating a relation between a stopper and a valve of the electromagnetically driven intake valve according to the first embodiment in which the present invention is carried out.

The valve stopper S0 as depicted in FIG. 3(B) includes the three cutouts Sn1 to Sn3 formed at different positions spaced by a particular distance from each other. The cutouts Sn1 to Sn3 are configured in such a manner that the total passage sectional area is greater than that of the annular fuel passage 10S formed between the valve seat 214S and the annular face portion 203R of the valve 203. As a result, the cutouts Sn1 to Sn3 do not provide passage resistance with the inflow of the fuel into the pressurizing chamber or the spill of the fuel from the pressurizing chamber. The fuel thereby flows smoothly.

Figure 3C:
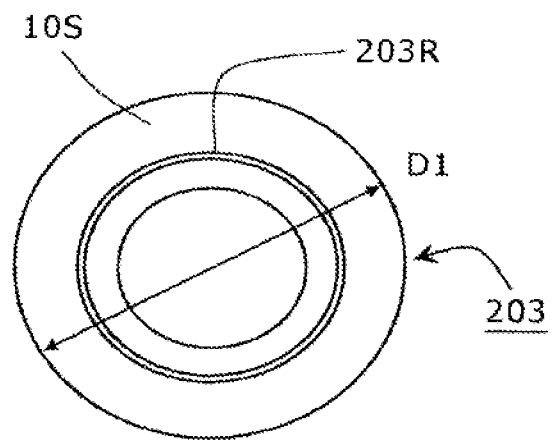
FIG. 3(C) is a view as seen in the direction indicated with the arrow mark P in FIG. 3(A) of the valve of the electromagnetically driven intake valve according to the first embodiment in which the present invention is carried out.

With reference to FIG. 3(C), the diameter D1 of the outer circumferential face of the valve 203 is configured to be slightly smaller than the diameter D3 {refer to FIG. 3(B)} of the cutout portions of the valve stopper S0. As a result, in a spilling state in which the fuel flows from the pressurizing chamber 12 into the damper chamber 10b past the intake joint 10 along a fuel flow R5 (FF) in FIGS. 3(A) and 3(B), static and dynamic fluid forces of the fuel at the pressurizing chamber 12 side indicated with an arrow mark P4 are less likely to act upon the annular face portion 203R of the valve 203.

A pressure equalizing hole S5 and a large diameter hole S6 are provided in the projection ST of the valve stopper S0 disposed at the inner side of the valve annular projection 203S. The pressure equalizing hole S5 is connected to the pressurizing chamber and a storage space SP for the valve biasing spring S4 provided between the valve 203 and the valve stopper S0. The large diameter hole S6 has a diameter greater than the pressure equalizing hole S5.

The pressure in the storage space SP is kept constant since the fuel is accordingly supplied into the spring storage space SP, in which the valve biasing spring S4 is stored, through the pressure equalizing hole S5 when the valve 203 closes. The force applied to the valve 203 when the valve 203 closes thereby becomes stable, which in turn can stabilize the closing timing of the valve 203.

The pressure equalizing hole S5 is disposed on the center axis of all of the valve stopper S0, projection ST, valve 203, annular projection 203S, spring storage space SP, valve biasing spring S4, valve seat center hole 214C, plunger rod 201 and tubular fuel introduction passage 10P.

Consequently, when the fuel is supplied into the storage space SP through the pressure equalizing hole S5 at the time the valve 203 closing, the pressure of the fuel does not act upon the spring. Therefore, such a situation will not occur that the spring vibrates or the spring is partially deformed by an action of the fuel entering the storage space SP. Since the force of the spring is only approximately 300 grams, if the fuel hits upon the spring when it enters from the pressure equalizing hole S5, then the spring is deformed readily by the flowing force or the pressure of the fuel. In an extreme case the spring vibrates to make the valve 203 tilted or immobile. The fuel does not contact the spring and the fuel pressure is introduced uniformly in a circumferential direction of the valve 203 from the pressurizing chamber 12 side into the storage space SP in the present embodiment. The closing timing of the valve 203 can be stabilized accordingly. In addition, since the pressure equalizing hole S5 is provided at the center of the valve stopper S0, there is no necessity to assemble the valve stopper S0 at the time of assembly of the valve stopper S0 while the pressure equalizing hole S5 is suitably positioned for every product. The assembly will not be complicated.

The pressure equalizing hole S5 preferably has a small diameter. This is intended to prevent the intake valve (valve 203) from being closed at an unexpected timing by a fluid pressure generated due to spilling fuel because the static or dynamic fluid force of the fuel at the pressurizing chamber 12 side indicated with an arrow mark P is less likely to act. Although it is preferable to prevent a dynamic component from entering the spring storage space SF but allow only a necessary static pressure to be introduced into the storage space SP, it is not denied for the fuel to flow into the storage space SP. An amount of the fuel is permissible as long as it is smoothly introduced into and discharged from the storage space SF in response to opening and closing of the valve 203.

Not only one pressure equalizing hole S5 may be provided, but a plurality of pressure equalizing holes S5 may be formed in an equally spaced intervals from each other around the center axis of the spring. In this case, the pressure equalizing holes S5 preferably should be configured in such a manner that the fuel introduced from the pressure equalizing holes S5 is introduced in parallel to the center axial line of the spring. The fuel alternatively can be introduced toward the center axis of the valve biasing spring S4 toward the rear face of the flat face portion 203F of the valve 203, so that pressure action axes of the fuel (center axial lines of the pressure equalizing holes S5) may not directly hit the spring. It should be taken into consideration that the pressure of the fuel introduced from the pressure equalizing holes S5 may act equally in a circumferential direction as seen from the valve 203. According to an optimum embodiment, the valve 203 may be configured such that the center axial line thereof overlaps with the center axial line of the valve biasing spring S4. Further, the valve guide SG formed from the outer circumference of the projection ST provided on the valve stopper S0 may be configured so that it guides the valve 203 so that the center axial line overlaps the center axial line of the valve 203. Further, the pressure equalizing holes S5 is preferably configured so that the center axial lines overlap the center axial line of the valve guide SG. Moreover, if the tip end of the pressure equalizing hole S5 is open to the position of the flat face portion 203F side of the valve 203 beyond the position of the valve seat 214S at this time, then an automatic centering action like that of a balance toy can be expected in a state where the valve 203 is supported on a pressure line of pressure fluid of the fuel introduced from the pressure equalizing holes S5.

The valve 203 in the embodiment has a weight of several milligrams, a diameter of 10.8 (mm) at the annular face portion 203R {D1 in FIG. 3(C)} and a diameter of 6.1 (mm) at an outer circumference of the cylindrical portion 203H, and an axial length of 7.4 (mm) from a stopper side end face of the annular projection 203S to the plunger rod 201 side end face of the flat face portion 203F thereof. If the passage sectional area of the fuel introduction passage 10P is calculated, then it will be 2.1*fifth power of 10 (square meters) since the inner diameter of the guide hole 1GH is 8.0 (mm) and the outer diameter of the tubular portion of the valve is 6.1 mm. If it is assumed that the speed of rotation of the engine is 6,000 rpm, then the period of rotation of the cam is 50 (Hz) and the speed of rotation of the cam is 314.2 (rad/sec). From that information, if the cam is a four-leaf cam, then the maximum speed of the piston plunger 2 at times of spilling and intake is approximately 7.6 (rad/mm), namely, 2,383 (mm/sec). The maximum flow velocity is approximately 8.9 (m/sec) and the flow rate at this time is 1.9*fourth power of 10 (cubic meters). If the cam is a three-leaf cam, then the maximum speed of the piston plunger 2 at times of spilling and suction is approximately 8.1 (rad/mm), namely, 2,553 (m/second) The maximum flow velocity is approximately 9.5 (m/sec) and the flow rate at this time is 1.9*fourth power of 10 (cubic meters). The force of the valve biasing spring S4 is approximately 3 (Nm).

In this manner, fuel of a greatly high flow rate flows around the quite light valve 203 in the opposite directions at times of suction and spilling. The valve 203 acts violently not only in the backward and forward directions but also in the leftward and rightward circumferential directions in the fluid for this reason, which has resulted in the great variation in discharge flow rate of the fuel. The pressure variation was found out to be great as depicted in FIG. 7A in the measurement of the pressure variation at the common rail at the time a prior art pump is used. In particular, when it was tried to control the pressure to 20 Mpa, a great pressure variation occurred between 23 Mpa in the maximum-18 Mpa in the minimum. In contrast, the pressure variation at the common rail using the high pressure fuel supply pump to which the present invention is applied was measured next. And the pressure variation when it was tried to control the pressure to 20 Mpa was suppressed successfully to minute variation as depicted in FIG. 7B.

Operation of the first embodiment will be described with reference to FIGS. 1, 2, 3(A), 3B, 4(A), and 4(B).

Fuel Suction State

A fuel intake state will now be described with reference to FIGS. 1, 2, 3(A), and 4(B). In an intake operation in which the piston plunger 2 moves downwardly in a direction indicated with an arrow mark Q2 from the top dead center position indicated with a broken line in FIG. 2, the coil 204 is in a non-energized state. Biasing force SP1 of the plunger rod biasing spring 202 biases the plunger rod 201 toward the valve 203 as indicated with an arrow mark. Meanwhile, biasing force SP2 of the valve biasing spring S4 biases the valve 203 in a direction indicated with an arrow mark. Since the biasing force SP1 of the plunger rod biasing spring 202 is set higher than the biasing force SP2 of the valve biasing spring S4, the biasing force of the springs at this time biases the valve 203 in the valve opening direction. The valve 203 is subjected to force in the valve opening direction as a consequence of a pressure difference between a static pressure P1 of the fuel acting upon the outer surface of the valve 203 represented by the flat face portion 203F of the valve 203 positioned in the low pressure fuel chamber 10a and a pressure P12 of the fuel in the pressurizing chamber. Further, fluid friction force P2 generated between the fuel flow which flows into the pressurizing chamber 12 along an arrow mark R4 through the fuel introduction passage 10P and the circumferential face of the cylindrical portion 203H of the valve 203 biases the valve 203 in the valve opening direction. Furthermore, a dynamic pressure P3 of the fuel flow which passes the fuel passage 10S formed between the valve housing 214 and the annular face portion 203R of the valve 203 acts upon the annular face portion 203R of the valve 203 to bias the valve 203 in the valve opening direction. The valve 203 whose weight is several milligrams is opened quickly due to the biasing forces once the piston plunger 2 starts to move downwardly. The valve 203 thereafter strokes until it collides with the valve stopper S0.

The valve housing 214 is formed on the outer side with respect to the cylindrical portion 203H of the valve 203 and the fuel introduction passage 10P in a diametrical direction. Consequently, at is possible to enlarge the area upon which the static pressure P1, fluid friction force P2, and dynamic pressure P3 P2 act and to enhance the opening speed of the valve 203. At this time, since the peripheral region of the plunger rod 201 and the anchor 207 is filled with resident fuel, and friction force of the fuel with the bearing portion 214B acts, the stroke of the plunger rod 201 and the anchor 207 in the rightward direction in the figures delays a little from the opening speed of the valve 203. As a result, a small gap is generated between the tip end face of the plunger rod 201 and the flat face portion 203F of the valve 203. Consequently, the valve opening force applied from the plunger rod 201 drops for a moment. However, since the static pressure P1 of the fuel in the low pressure fuel chamber 10a acts upon the gap without a delay, the drop of the valve opening force applied from the plunger rod 201 (plunger rod biasing spring 202) is compensated for by the fluid force in the opening direction of the valve 203. Thus, at the time of opening of the valve 203, the static pressure and the dynamic pressure of the fluid act upon the overall surface of the valve 203 at the low pressure fuel chamber 10a side, and consequently, the valve opening speed is accelerated.

At the time of opening of the valve 203, the inner circumferential face of the cylindrical portion 203H of the valve 203 is guided by the valve guide formed from the cylindrical face portion SG of the projection ST of the valve stopper S0. The valve 203 smoothly strokes without being displaced in a diametrical direction. The cylindrical face portion SG which forms the valve guide is formed across the upstream side and the downstream side across the face on which the valve seat 214S is formed. Therefore, not only the stroke of the valve 203 can be supported, but also the dead space at the inner periphery side of the valve 203 can be utilized effectively. The dimension of the intake valve unit in the axial direction can be reduced accordingly. Further, the valve biasing spring S4 is installed between the valve side end face SH of the valve stopper S0 and the valve stopper S0 side bottom face portion of the flat face portion 203F of the valve 203. While the passage area of the fuel introduction passage 10P formed between the opening 204P and the cylindrical portion 203H of the valve 203 can be assured sufficiently, the valve 203 and the valve biasing spring S4 can be disposed on the inner side of the opening 214P. Since the valve biasing spring S4 can be disposed as a result of the dead space effectively utilized at the inner periphery side of the valve 203 positioned on the inner side of the opening 214P which forms the fuel introduction passage 10P, the dimension of the intake valve unit in the axial direction can be reduced.

The valve 203 has a valve guide (SG) at its central portion and has the annular projection 203S which contacts with the receiving face S2 for an annular face portion S3 of the valve stopper S0 immediately on the outer periphery of the valve guide (SG). Further, the valve seat 214S is formed at a position at the outer side in a diametrical direction with respect to the annular projection 203S, and the annular air gap SGP extends to a further outer side in the radial direction. The large diameter hole S6 is formed from an inner circumferential face of the valve housing at the outer side of the annular air gap SGP (at the outer periphery side of the valve 203 and the valve stopper S0). Since the large diameter hole S6 is formed on the outer side in the diametrical direction of the valve housing 214, there is an advantage that the large diameter hole S6 can be assured to be sufficiently large.

Further, the annular projection 203S which contacts with the receiving face S2 of the valve stopper S0 is provided at the inner side of the valve housing 214 at the inner side of the annular air gap SGP. Therefore, in a valve closing movement hereinafter described, it is possible to cause a fluid pressure P4 at the pressurizing chamber side to act upon the annular air gap SGP rapidly so as to raise the valve closing speed when the valve 203 is pressed toward the valve housing 214.

Fuel Spilling State

A fuel spilling state will be described with reference to FIGS. 1, 2, 3(A), and 4(B). The piston plunger 2 begins to move upwardly in the direction of an arrow mark Q1 from the bottom dead center position. Thereupon, since the coil 204 is in a non-energized state, part of the fuel taken into the pressurizing chamber 12 is spilled (spilt) into the low pressure fuel chamber 10a through the cutouts Sn1 to Sn3, fuel passage 10S, and fuel introduction passage 10P. When the flow of the fuel in the large diameter hole S6 changes over from the direction of the arrow mark R4 to the direction of the arrow mark R5, the flow of the fuel stops for a moment and the pressure in the annular air gap SGP rises. However, the plunger rod biasing spring 202 presses the valve 203 toward the valve stopper S0 at this time. Rather, the valve 203 is pressed firmly toward the valve stopper S0 by means of the two types of fluid pressure: the first one pressing the valve 203 toward the valve stopper S0 with the use of the dynamic pressure by the fuel flowing into the low pressure fuel chamber 10a of the valve housing 214; and the second one acting so as to attract the valve 203 and the valve stopper S0 to each other by means of the sucking effect of the fuel flow which flows along the outer periphery of the annular air gap SGP.

After a moment at which the flow stream changes over to the R5 direction, the fuel in the pressurizing chamber 12 flows into the low pressure fuel chamber 10a successively passing the large diameter hole S6, annular fuel passage 10S, and fuel introduction passage 10P. Here, the fuel flow path sectional area of the fuel passage 10S is set smaller than that of the large diameter hole S6 and the fuel introduction passage 10P. In other words, the fuel flow path sectional area is set smallest at the annular fuel passage 10S. Therefore, pressure loss is generated at the annular fuel passage 10S and the pressure in the pressurizing chamber 12 begins to rise. However, the fluid pressure P4 is received at the annular face of the valve stopper S0 at the pressurizing chamber side and is less likely to act upon the valve 203. Since the pressure equalizing hole S5 has a small diameter, the dynamic fluid force of the fuel at the pressurizing chamber 12 side indicated with the arrow mark P4 Less likely to act upon the valve 203.

In the spilling state, the fuel flows from the low pressure fuel chamber 10a into the damper chamber 10b through the annular air gap SGP and through the four fuel through holes 214Q. Since the piston plunger 2 moves upwardly and the volume of the fuel auxiliary chamber 250 thereupon increases, part of the fuel is introduced from the damper chamber 10b into the fuel auxiliary chamber 250 by means of a fuel flow in a down ward arrow mark direction of an arrow mark R8 through the vertical passage 250B, annular passage 21G, and fuel passage 250A. The cold fuel is thus supplied into the fuel sub chamber, and the sliding region between the piston plunger 2 and the cylinder 20 is cooled accordingly.

Fuel Discharging State

Figure 4A:
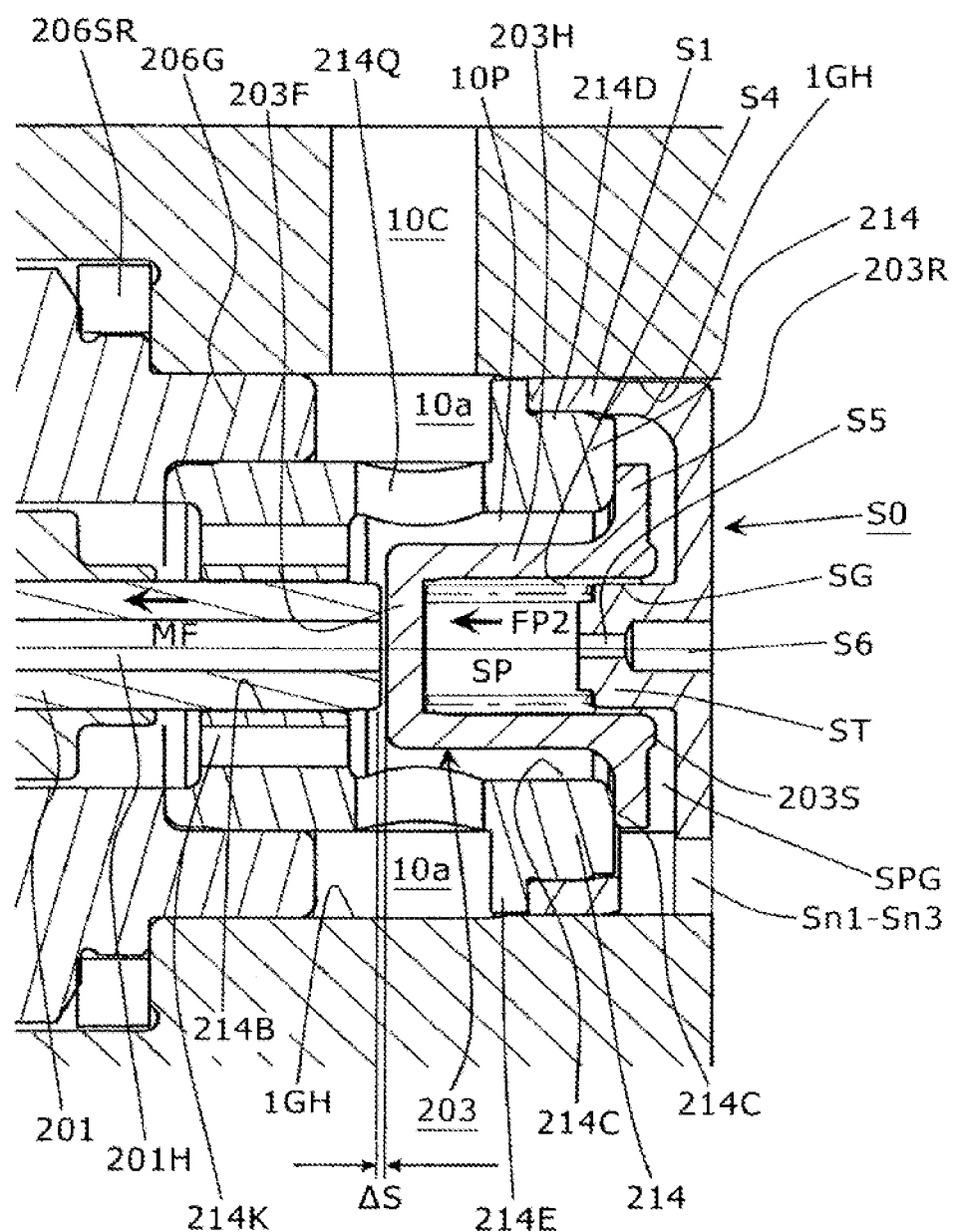
FIG. 4(A) is an enlarged sectional view of the electromagnetically driven intake valve according to the first embodiment in which the present invention is carried out and illustrates a state of the intake valve in a state at the time of fuel discharge (upon valve closing).
Figure 4B:
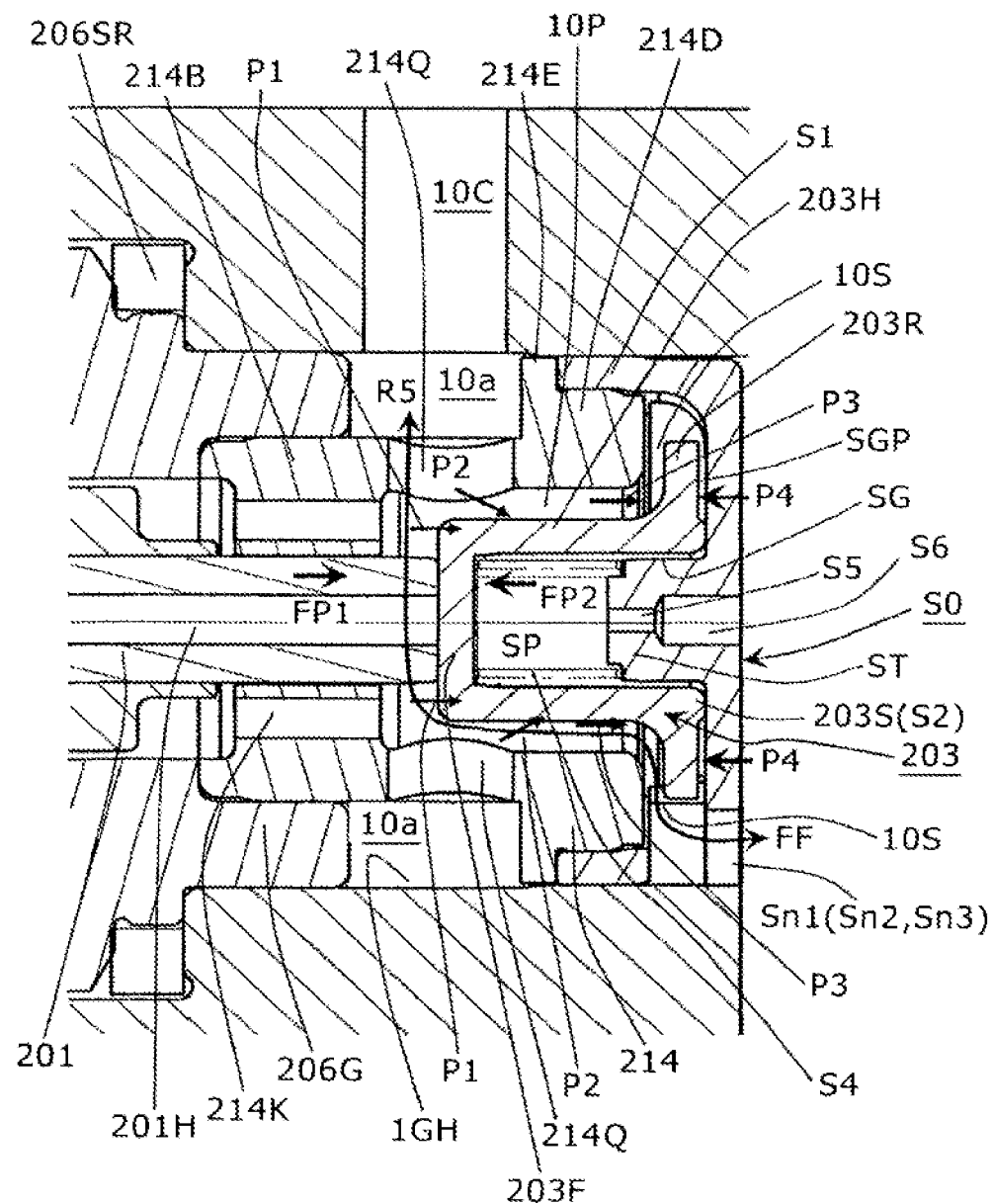
FIG. 4(B) is an enlarged sectional view of the electromagnetically driven intake valve according to the first embodiment in which the present invention is carried out and illustrates a state of the intake valve in a state at the time of fuel discharge (at times of fuel intake and spilling).

A fuel discharging state will be described with reference to FIG. 4(A). If the coil 204 is energized in accordance with an instruction from the engine controlling apparatus ECU in the fuel spilling state described above, then a closed magnetic path CMP is created as depicted in FIG. 3(A). When the closed magnetic path CMP is formed, magnetic attractive force is generated between opposing faces of the inner core 206B and the anchor 207 in the magnetic gap GP. This magnetic attractive force overcomes the biasing force of the plunger rod biasing spring 202 to attract the anchor 207 and the plunger rod 201 fixed to the anchor 207 toward the inner core 206B. At this time, the fuel in the magnetic gap GP and the storage chamber 206K for the plunger rod biasing spring 202 passes through the through-hole 201H and the periphery of the anchor 207 and is discharged from the fuel passage 214K to the low pressure passage. Consequently, the anchor 207 and the plunger rod 201 are displaced to the inner core 206B side smoothly. Once the anchor 207 is brought into contact the inner core 206B, the movement of the anchor 207 and the plunger rod 201 stops.

Since the plunger rod 201 is attracted to the inner core 206B and the biasing force which biases the valve 203 to the valve stopper S0 side disappears, the valve 203 is urged in a direction where it moves farther away from the valve stopper S0 due to the biasing force by the valve biasing spring S4. The valve 203 then begins its movement. At this time, the pressure in the annular air gap SGP positioned at the outer periphery side of the annular projection 203S becomes higher than the pressure at the low pressure fuel chamber 10a side accompanied with the pressure rise in the pressurizing chamber 12 thereby to assist the closing movement of the valve 203. The valve 203 is brought into contact the valve housing 214 to establish a valve closed state. This state is illustrated in FIG. 4(A). As the piston plunger 2 consecutively moves upwardly, the volume of the pressurizing chamber 12 decreases and the pressure in the pressurizing chamber 12 increases. As a result, the valve 63 of the discharge valve unit 60 moves away from the valve seat 61 as depicted in FIGS. 1 and 2 after overcoming the force of the biasing spring 64. The fuel is then discharged from the through hole 11A in directions along arrow marks R6 and R7 through the discharge joint 11.

In this manner, the annular air gap SGP exhibits an advantage of assisting the closing movement of the valve 203. There was a problem that the valve closing movement is not stabilized since the valve biasing spring S4 itself exerts excessively little closing force of the intake valve.

Since the fuel is supplied into the storage space SP through the pressure equalizing hole S5 when the valve 203 is closed, the pressure in the storage space SP becomes constant, and the force applied when the valve 203 is closed is stabilized. The closing timing of the valve 203 can be stable as a result.

It is accordingly possible to reduce the dispersion of the valve closing timing with the present invention while the responsiveness at times of opening and closing of the valve is enhanced.

Second Embodiment

Figure 5B:
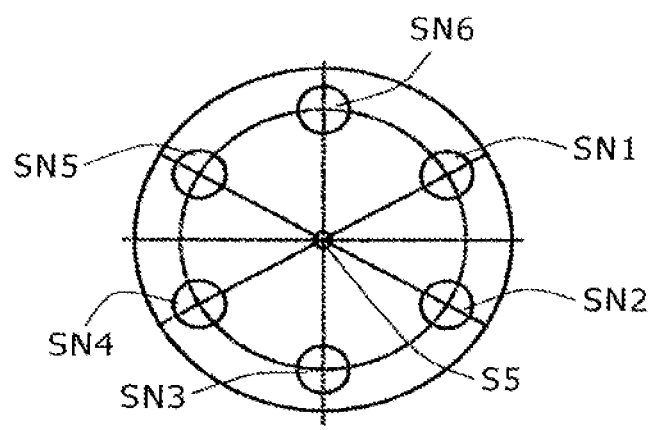

A second embodiment will be described with reference to FIGS. 5A and 5B. Those elements having like functions to those in the first embodiment are denoted by like reference numerals in FIGS. 5A and 5B. An electromagnetically driven intake valve of the second embodiment depicted in FIGS. 5A and 5B is configured as a valve of the outwardly opening type including a valve 203 at a pressurizing chamber 12 side of a valve seat 214S. The valve 203 is disposed at a pressuring chamber side with respect to the valve seat 214S (at a downstream side of the valve seat). A valve stopper S0 is disposed between the pressurizing chamber 12 and the valve 203 and restricts the opening position of the valve 203. Through-holes SN1 to SN6 (corresponding to the cutouts Sn1 to Sn3) are provided in the valve stopper S0 and form fuel passages at an outer side of the valve 203 in a circumferential direction. A tubular fuel introduction passage 10P is connected at its one end to a low pressure fuel chamber 10a and at the other end to an annular (disk-shaped) fuel passage 10S formed between the valve seat 214S and a flat face portion 203F of the valve 203. The through-holes SN1 to SN6 configure passages for connecting the pressurizing chamber 12 and the annular (disk-shaped) fuel passage 10S with each other. A valve biasing spring S4 is provided between the valve stopper S0 and the valve 203 and biases the valve 203 in its closing direction. A spring storage space SP is formed between the valve 203 and the valve stopper S0 and houses the valve biasing spring S4 therein. A pressure equalizing hole S5 as a communication passage for connecting the spring storage space SP and the pressurizing chamber 12 with each other is provided at the center of the valve stopper S0.

Whenever the plunger in the pressurizing chamber 12 enters a compression operation and the coil is energized at a valve closing timing, the plunger rod 201 is pulled leftwardly in FIGS. 5A and 5B against the force of the plunger rod biasing sprig 202. The left end of the plunger rod 201 then moves away from the flat face portion 203F of the valve 203. The valve 203 is urged in the closing direction by means of the valve biasing spring S4 at this time. The pressure in the pressurizing chamber is introduced into the inner side, particularly to the center, of the valve biasing spring S4 through the pressure equalizing hole S5 without traversing the spring. The introduced pressure is distributed uniformly to the inner circumferential face of the valve 203 and assists the closing movement of the valve 203 without having a negative influence on the closing movement the valve 203. When the compression operation ends and the piston plunger 2 enters an intake operation, then the valve 203 is pushed rightwardly in FIGS. 5(A) and 5(B) against the force of the valve biasing spring S4 by means of the force of the plunger rod biasing spring 202 and the pressure difference across the annular (disk-shaped) fuel passage 10S. The valve 203 subsequently enters an open state. At this time, the fuel in the spring storage space SP is discharged from the pressure equalizing hole S5 due to the movement of the valve 203. While the outer circumferential face of the valve 203 is guided by the inner circumferential face of the valve stopper S0 in the present embodiment, the function of the pressure equalizing hole S5 is fundamentally the same as that in the first embodiment.

Third Embodiment

A third embodiment will be described with reference to FIGS. 6A and 6B. Those elements having like functions to those in the first embodiment are denoted by like reference numerals in FIGS. 6A and 6B. An electromagnetically driven intake valve of the third embodiment depicted in FIGS. 6A and 6B is configured from a valve of the outwardly opening type including a valve 203 at a pressurizing chamber 12 side of a valve seat 214S. The valve 203 is disposed at a pressuring chamber side with respect to the valve seat 214S (at a downstream side of the valve seat). A valve stopper S0 is provided between the pressurizing chamber 12 and the valve 203 and restricts the open position of the valve 203. Through-holes SN1 to SN6 (corresponding to the cutouts Sn1 to Sn3 in the first embodiment and corresponding to the through-holes SN1 to SN6 in the second embodiment) are provided so as to extend obliquely outwardly from an end face of the valve stopper S0 the pressurizing chamber side through the valve stopper S0. In the third embodiment, the valve stopper S0 is press-fitted and fixed at are outer circumference thereof with and to an inner circumference of a tip end of a valve housing 214. A guide SGV is provided on the outer circumference of the valve stopper S0 at the valve 203 side such that it guides the inner circumferential face of the valve 203. A tubular fuel passage 12V is formed between the outer periphery of the valve 203 and the inner periphery of the valve housing. A tubular fuel introduction passage 10P is connected at its one end to the low pressure fuel chamber 10a and at the other end to an annular (ring-shaped) fuel passage 10S formed between the valve seat 214S and an annular projecting face portion 203M Projecting from the flat face portion 203F of the valve 203. The through-holes SN1 to SN6 configure passages for connecting the pressurizing chamber 12 and the tubular fuel passage 12V with each other, and the annular (ring-shaped) fuel passage 10S is made to communicate with the tubular fuel passage 12V. A valve biasing spring S4 is provided between the valve stopper S0 and the valve 203 and biases the valve 203 in the closing direction. A spring storage space SP is formed between the valve 203 and the valve stopper S0 and houses the valve biasing spring S4 therein. A pressure equalizing hole S5 as a communication path for connecting the spring storage space SP and the pressurizing chamber 12 with each other is provided at the center of the valve stopper S0. A large diameter hole S6 having a diameter greater than that of the pressure equalizing hole S5 is provided at the pressurizing chamber 12 side of the pressure equalizing hole S5. The pressure equalizing hole S5 extends from the bottom of the large diameter hole S6 to the spring storage space SP. To configure the pressure equalizing hole S5 from a hole of a different diameter in this manner is the same as that in the case of the first embodiment. In the present embodiment, the valve housing 214 is press-fitted at an outer periphery of its one end in the inner periphery of a guide hole 1GH provided in the pump housing 1 and is fixed at the other end in the axial direction by means of a C-snap ring CR locked to the pump housing 1.

Whenever the plunger in the pressurizing chamber 12 enters a compression operation and the coil is energized at a valve closing timing, the plunger rod 201 is pulled leftwardly in FIG. 6(A) against the force of a spring not shown. The tip end of the plunger rod 201 then moves away from the annular projecting face portion 203M. At this time, the valve 203 is urged in the closing direction by means of the valve biasing spring S4. The pressure in the pressurizing chamber is introduced into the inner side, especially to a central region, of the valve biasing spring S4 through the pressure equalizing hole S5 without traversing the valve biasing spring S4. The pressure introduced in the spring storage space SP is distributed uniformly to the inner circumferential face of the valve 203 and assists the closing movement of the valve 203 without having a negative influence on the closing movement of the valve 203. After the compression operation ends and the piston plunger 2 enters an intake operation, the valve 203 is pushed rightwardly in FIGS. 6(A) and 6(B) against the force of the valve biasing spring S4 by means of the force of the spring (not shown) of the electromagnetically driving apparatus and the pressure difference across the annular (ring-shaped) fuel passage 10S and enters an open state. At this time, the fuel in the spring storage space SP is discharged from the pressure equalizing hole S5 due to the movement of the valve 203. While the inner circumferential face of the valve 203 is guided by the guide SGV formed on the outer circumference of the valve stopper S0 in the present embodiment, the function of the pressure equalizing hole S5 is basically the same as that in the first embodiment.

REFERENCE NUMERALS 1 pump housing
2 piston plunger
3 lifter
4 spring
5 plunger seal
7 cam
10 intake joint
10a low pressure fuel chamber
10b damper chamber
10p fuel introduction passage
10S annular fuel passage
11 discharge joint
12 pressurizing chamber
20 cylinder
21 cylinder holder
22 seal holder
30 damper holder
40 damper cover
50 fuel tank
51 low pressure pump
53 common rail
54 injector
56 pressure sensor
80 metal diaphragm damper (assembly)
200 electromagnetically driven intake valve mechanism
201 plunger rod
203 valve
203H cylindrical portion
214 valve housing
214P opening
214S valve seat
250 fuel auxiliary chamber
600 engine controlling unit (ECU)
EMD electromagnetically driving mechanism unit
S0 valve stopper
SG valve guide

The invention claimed is:

1. A high pressure fuel pump comprising:
a pressurizing chamber provided in a pump housing, an intake valve opening and closing a fuel passage communicating a low pressure chamber and the pressurizing chamber, a valve stopper restricting an open position of the intake valve, and a spring biasing the intake valve in a valve closing direction provided in a space between the intake valve and the valve stopper, wherein the valve closing direction is an axial direction of the intake valve;

wherein the valve stopper forms a passage for communicating the space with an outside of the space, and includes a guide portion for guiding opening and closing of the intake valve, wherein the intake valve comprises:
- a bottom portion in contact with the spring, and a cylindrical portion guided by the guide portion, and an inner peripheral surface of the cylindrical portion faces the spring,
- a contact portion in contact with the valve stopper in a full valve opening position, and
- a non-contact portion forming a gap between the valve stopper and the intake valve in the full valve opening position, wherein the non-contact portion is located outwardly of the cylindrical portion in a radial direction of the intake valve.

2. The high pressure fuel pump according to claim 1, wherein the inner peripheral surface guides a movement of the spring.

3. The high pressure fuel pump according to claim 1, wherein an inner surface of the bottom portion is formed in a flat shape.

4. The high pressure fuel pump according to claim 1, wherein the cylindrical portion has an annular portion extending radially outward of an outer diameter of the cylindrical portion.

5. The high pressure fuel pump according to claim 1, wherein
the passage is configured such that the space is communicated with the pressurizing chamber in a close position of the intake valve, and
an outer circumferential surface of the valve stopper is in contact with an inner circumferential surface of a hole in the pump housing.

* * * * *